(12) United States Patent
Higuchi et al.

(10) Patent No.: US 11,134,204 B2
(45) Date of Patent: Sep. 28, 2021

(54) IMAGE PROCESSING APPARATUS AND IMAGE TRANSFORMATION METHOD

(71) Applicant: Clarion Co., Ltd., Saitama (JP)

(72) Inventors: Haruhiko Higuchi, Tokyo (JP); Kazuhiko Tanaka, Tokyo (JP)

(73) Assignee: CLARION CO., LTD., Saitama (JP)

( * ) Notice: Subject to any disclaimer, the term of this patent is extended or adjusted under 35 U.S.C. 154(b) by 56 days.

(21) Appl. No.: 16/627,723

(22) PCT Filed: Jun. 7, 2018

(86) PCT No.: PCT/JP2018/021906
§ 371 (c)(1),
(2) Date: Dec. 30, 2019

(87) PCT Pub. No.: WO2019/003854
PCT Pub. Date: Jan. 3, 2019

(65) Prior Publication Data
US 2021/0160437 A1 May 27, 2021

(30) Foreign Application Priority Data
Jun. 30, 2017 (JP) ............................. JP2017-128280

(51) Int. Cl.
*B60R 1/00* (2006.01)
*H04N 5/262* (2006.01)
(Continued)

(52) U.S. Cl.
CPC ....... *H04N 5/2628* (2013.01); *G06K 9/00201* (2013.01); *G06K 9/00791* (2013.01);
(Continued)

(58) Field of Classification Search
CPC .... H04N 5/2628; H04N 5/247; G06K 9/4652; G06K 9/4604; G06K 9/4661;
(Continued)

(56) References Cited

U.S. PATENT DOCUMENTS

2007/0003162 A1  1/2007 Miyoshi et al.
2010/0220189 A1  9/2010 Yanagi
(Continued)

FOREIGN PATENT DOCUMENTS

JP  2003-216934 A  7/2003
JP  2012-138660 A  7/2012
(Continued)

OTHER PUBLICATIONS

Japanese Office Action dated Apr. 13, 2021 regarding Japanese Patent Application No. 2017-128280 corresponding to U.S. Appl. No. 16/627,723 (5 pages) with English Translation (5 pages).
(Continued)

*Primary Examiner* — Howard D Brown, Jr.
(74) *Attorney, Agent, or Firm* — Lewis Roca Rothgerber Christie LLP

(57) ABSTRACT

An image processing apparatus includes: an image acquisition unit that acquires a captured image with a first spatial resolution; a distance acquisition unit that acquires a distance image which is depth information with a second spatial resolution that is a resolution lower than the first spatial resolution; an image recognition unit that extracts an area including a three-dimensional object area corresponding to a three-dimensional object in the captured image; a distance calculation unit that calculates depth information of the three-dimensional object area on the basis of the distance image; a correction unit that corrects coordinate transformation information for coordinate transformation of the captured image on the basis of the depth information of the three-dimensional object area calculated by the distance calculation unit; and a viewpoint transformed image generation unit that generates a viewpoint transformed image obtained by the coordinate transformation of the captured
(Continued)

image by using the coordinate transformation information corrected by the correction unit.

14 Claims, 18 Drawing Sheets

(51) Int. Cl.

| | | |
|---|---|---|
| *G06T 7/50* | (2017.01) | |
| *G06K 9/00* | (2006.01) | |
| *G06K 9/62* | (2006.01) | |
| *G06T 7/73* | (2017.01) | |
| *G06K 9/46* | (2006.01) | |
| *H04N 5/247* | (2006.01) | |

(52) U.S. Cl.
CPC ......... *G06K 9/4604* (2013.01); *G06K 9/4652* (2013.01); *G06K 9/4661* (2013.01); *G06K 9/6261* (2013.01); *G06T 7/50* (2017.01); *G06T 7/73* (2017.01); *H04N 5/247* (2013.01); *G06T 2207/10028* (2013.01); *G06T 2207/30252* (2013.01)

(58) Field of Classification Search
CPC ........... G06K 9/00201; G06K 9/00791; G06K 9/6261; G06T 7/73; G06T 7/50; G06T 2207/10028; G06T 2207/30252
See application file for complete search history.

(56) References Cited

U.S. PATENT DOCUMENTS

| | | | |
|---|---|---|---|
| 2014/0063197 A1 | | 3/2014 | Yamamoto et al. |
| 2014/0139640 A1 | | 5/2014 | Shimizu |
| 2015/0084755 A1 | | 3/2015 | Chen et al. |
| 2017/0096106 A1 | * | 4/2017 | Higuchi .................. G06T 5/002 |
| 2017/0358056 A1 | | 12/2017 | Higuchi et al. |
| 2020/0083019 A1 | * | 3/2020 | Ida ........................ H01J 37/261 |
| 2020/0210726 A1 | * | 7/2020 | Yang ........................ G06N 3/04 |
| 2020/0218979 A1 | * | 7/2020 | Kwon ................ B60W 60/0011 |
| 2020/0320728 A1 | * | 10/2020 | Tsunashima ........... H04N 7/181 |
| 2020/0329215 A1 | * | 10/2020 | Tsunashima ............. G01C 3/14 |

FOREIGN PATENT DOCUMENTS

| | | |
|---|---|---|
| JP | 2012-214169 A | 11/2012 |
| JP | 2016-143381 A | 8/2016 |
| JP | 2016-181072 A | 10/2016 |
| WO | WO 2007/015446 A1 | 2/2007 |
| WO | WO 2013/018173 A1 | 2/2013 |
| WO | WO 2015/194501 A1 | 12/2015 |

OTHER PUBLICATIONS

Chinese Office Action dated Sep. 30, 2020 regarding Chinese Patent Application No. 201880043396.4 corresponding to U.S. Appl. No. 16/627,723 (7 pages) with English Translation (8 pages).
Extended European Search Report dated Oct. 2, 2020 for corresponding European Application No. 18824785.2 (9 pages).
International Search Report and Written Opinion of corresponding PCT/JP2018/021906, dated Aug. 28, 2018, 12 pages including English translation of ISR.

* cited by examiner

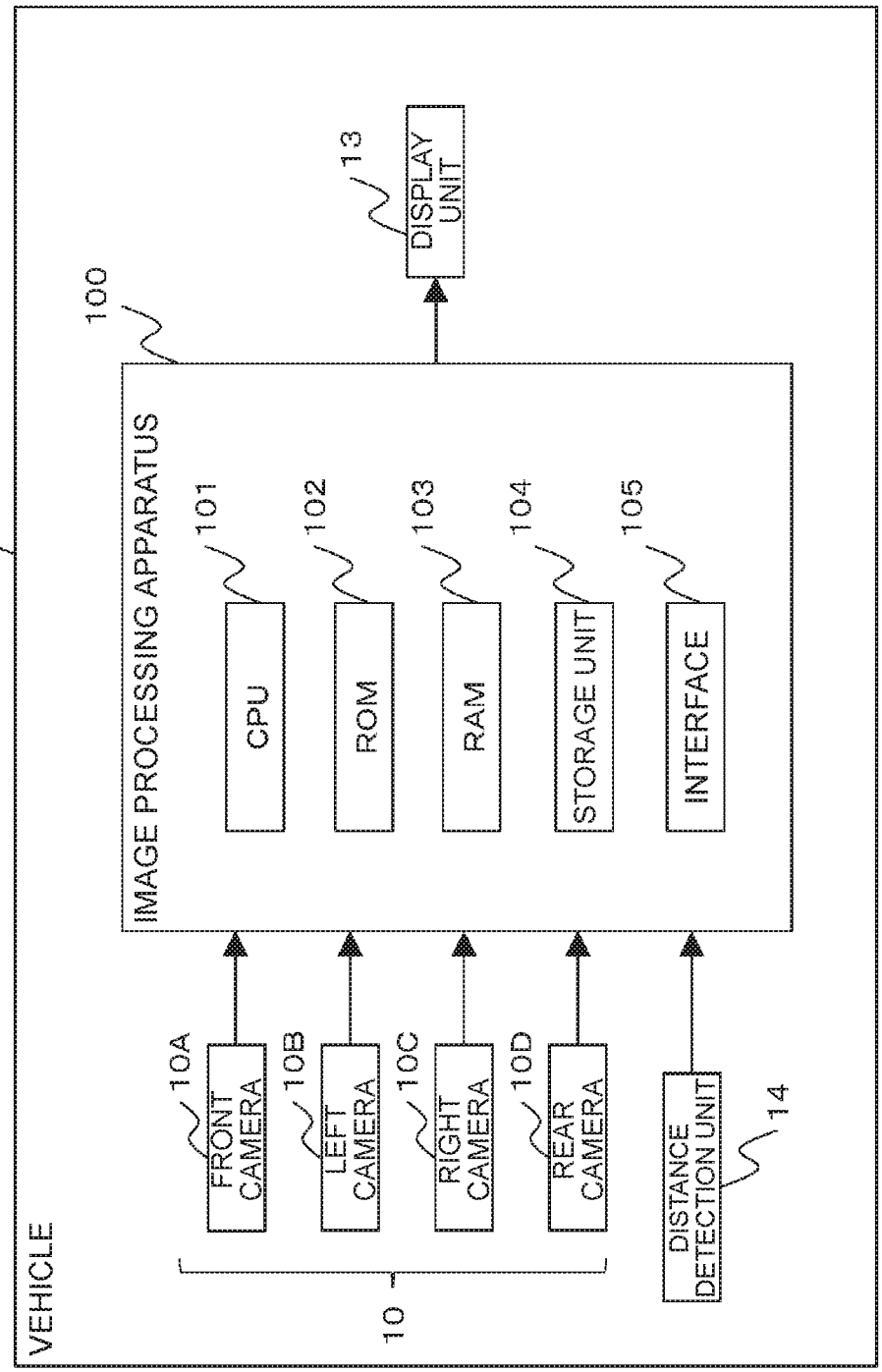

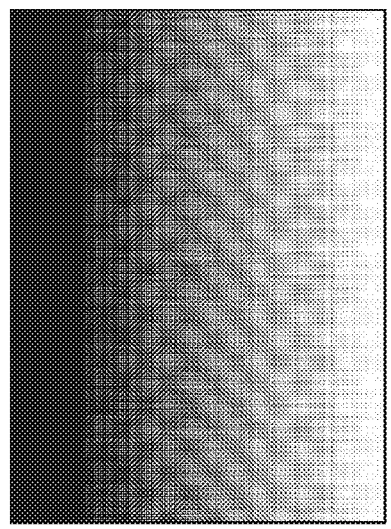
*FIG. 2B*
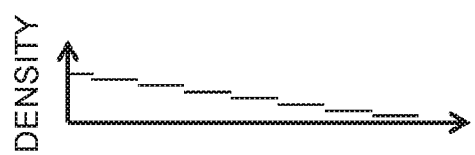
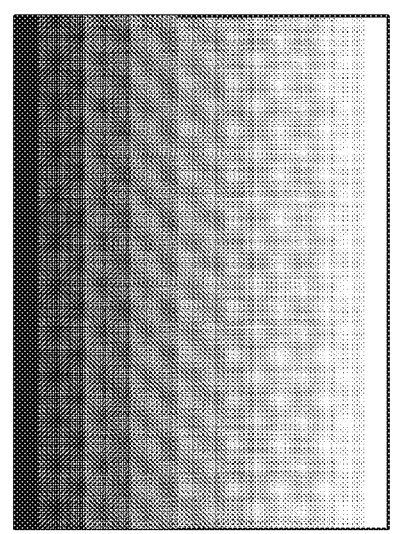
*FIG. 2A*
*FIG. 2C*

800

| CORRES-PONDENCE RELATION-SHIP NUMBER | COORDINATES IN CAPTURED IMAGE | | COORDINATES IN VIEWPOINT TRANSFORMED IMAGE | |
|---|---|---|---|---|
| | Xr COORDINATE | Yr COORDINATE | Xv COORDINATE | Yv COORDINATE |
| 1 | xr1 | yr1 | xv1 | yv1 |
| 2 | xr2 | yr2 | xv2 | yv2 |
| 3 | xr3 | yr3 | xv3 | yv3 |
| 4 | xr4 | yr4 | xv4 | yv4 |
| ⋮ | ⋮ | ⋮ | ⋮ | ⋮ |
| n | xrn | yrn | xvn | yvn |

FIG. 8

| CORRES-PONDENCE RELATION-SHIP NUMBER | COORDINATES IN CAPTURED IMAGE | | COORDINATES IN VIEWPOINT TRANSFORMED IMAGE (BEFORE CORRECTION) | | THREE-DIMENSIONAL OBJECT DISTANCE | COORDINATES IN VIEWPOINT TRANSFORMED IMAGE (AFTER CORRECTION) | |
|---|---|---|---|---|---|---|---|
| | Xr COORDINATE | Yr COORDINATE | Xv COORDINATE | Yv COORDINATE | | Xv COORDINATE | Yv COORDINATE |
| o1 | xr_o1 | yr_o1 | xv_o1 | yv_o1 | d1 | xv_o1' | yv_o1' |
| o2 | xr_o2 | yr_o2 | xv_o2 | yv_o2 | d2 | xv_o2' | yv_o2' |
| o3 | xr_o3 | yr_o3 | xv_o3 | yv_o3 | d3 | xv_o3' | yv_o3' |
| ... | ... | ... | ... | ... | ... | ... | ... |
| oi | xr_oi | yr_oi | xv_oi | yv_oi | di | xv_oi' | yv_oi' |

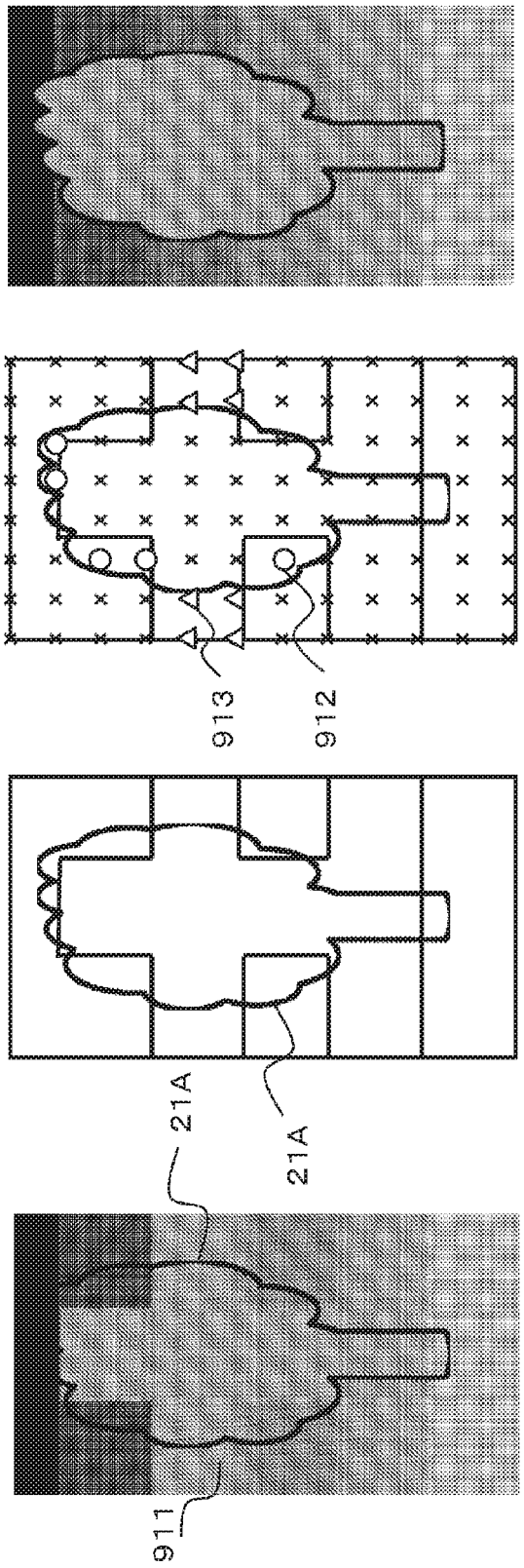

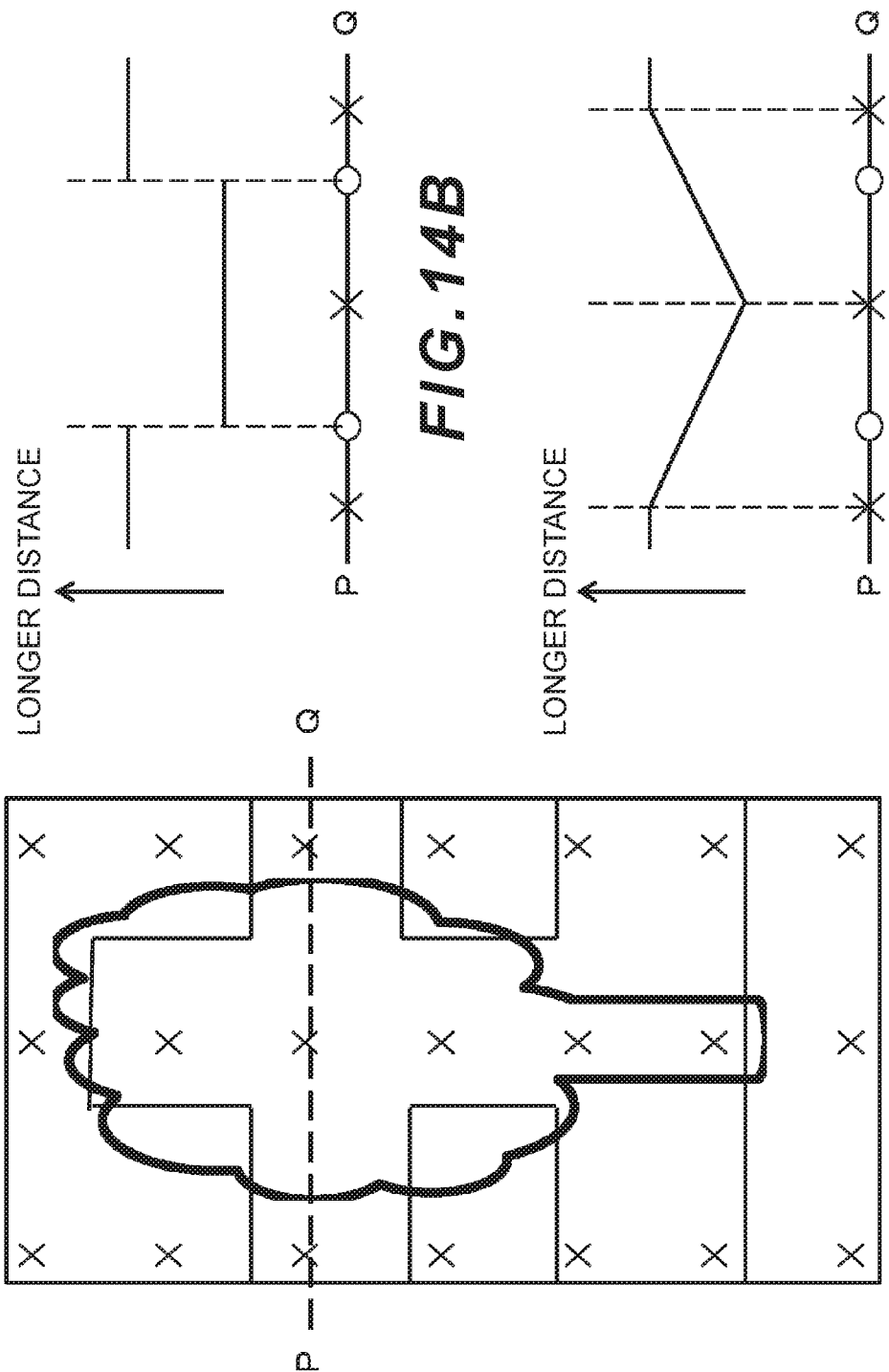

FIG. 17

| CORRES-PONDENCE RELATION-SHIP NUMBER | COORDINATES IN CAPTURED IMAGE (BEFORE CORRECTION) | | COORDINATES IN CAPTURED IMAGE (AFTER CORRECTION) | | COORDINATES IN VIEWPOINT TRANSFORMED IMAGE (BEFORE CORRECTION) | | THREE-DIMENSIONAL OBJECT DISTANCE | COORDINATES IN VIEWPOINT TRANSFORMED IMAGE (AFTER CORRECTION) | |
|---|---|---|---|---|---|---|---|---|---|
| | Xr COORDINATE | Yr COORDINATE | Xr COORDINATE | Yr COORDINATE | Xv COORDINATE | Yv COORDINATE | | Xv COORDINATE | Yv COORDINATE |
| o1 | xr_o1 | yr_o1 | xr_o1 | yr_o1 | xv_o1 | yv_o1 | d1 | xv_o1' | yv_o1' |
| o2 | xr_o2 | yr_o2 | xr_o2' | yr_o2' | xv_o2 | yv_o2 | d2 | xv_o2' | yv_o2' |
| o3 | xr_o3 | yr_o3 | xr_o3' | yr_o3' | xv_o3 | yv_o3 | d3 | xv_o3' | yv_o3' |
| o4 | — | — | xr_o4 | yr_o4 | — | — | d4 | xv_o4 | yv_o4 |
| ... | ... | ... | | | ... | ... | ... | ... | ... |
| oi | xr_oi | yr_oi | xr_oi | yr_oi | xv_oi | yv_oi | di | xv_oi' | yv_oi' |

IMAGE PROCESSING APPARATUS AND IMAGE TRANSFORMATION METHOD

CROSS-REFERENCE TO RELATED APPLICATION(S)

This application is a U.S. National Phase Patent Application and claims priority to and the benefit of International Application Number PCT/JP2018/021906, filed on Jun. 7, 2018, which claims priority of Japanese Patent Application Number 2017-128280, filed on Jun. 30, 2017, the entire contents of all of which are incorporated herein by reference.

TECHNICAL FIELD

The present invention relates to an image processing apparatus and an image transformation method.

BACKGROUND ART

There is known an image display system that captures images of the surroundings of a vehicle by using a camera(s) installed on the vehicle and displays the captured and thereby obtained images within the vehicle. A driver can check the state of surroundings of the vehicle in a highly visible manner by using the above-described image display system. PTL 1 discloses a display apparatus for a vehicle, which has: a captured image acquisition means that acquires data of a captured image(s) captured by a camera(s) mounted on the vehicle; a viewpoint setting means that sets a virtual viewpoint for a video to be displayed; a coordinate system transformation means that obtains a transformed coordinate system by transforming at least part of a reference curved surface coordinate system, which is defined in advance to project the captured image and has a curved surface, according to the position of the virtual viewpoint relative to the reference curved surface coordinate system; a projection means that projects the data of the captured image onto the transformed coordinate system and produces a video of the vehicle and the surroundings of the vehicle as viewed from the set virtual viewpoint; and a display control means that displays the produced video on a display screen.

CITATION LIST

Patent Literature

PTL 1: Japanese Patent Application Laid-Open Publication No. 2012-138660

SUMMARY OF THE INVENTION

Technical Problem

Regarding the invention described in PTL 1, when a three-dimensional object is included in the captured and thereby obtained image, image distortion of the three-dimensional object occurs in a viewpoint transformed image. A method of displaying an image with reduced distortion by also using a distance sensor is widely known; and spatial resolution of the distance sensor is generally closely related to the image distortion which occurs in the three-dimensional object in the viewpoint transformed image. Accordingly, it is difficult to produce a high-precision viewpoint transformed image by using the distance information with low spatial resolution.

Solution to Problem

An image processing apparatus according to a first aspect of the present invention includes: an image acquisition unit that acquires a captured image with a first spatial resolution; a distance acquisition unit that acquires a distance image which is depth information with a second spatial resolution that is a resolution lower than the first spatial resolution; an image recognition unit that extracts an area including a three-dimensional object area corresponding to a three-dimensional object in the captured image; a distance calculation unit that calculates depth information of the three-dimensional object area on the basis of the distance image; a correction unit that corrects coordinate transformation information for coordinate transformation of the captured image on the basis of the depth information of the three-dimensional object area calculated by the distance calculation unit; and a viewpoint transformed image generation unit that generates a viewpoint transformed image obtained by the coordinate transformation of the captured image by using the coordinate transformation information corrected by the correction unit.

An image transformation method according to a second aspect of the present invention includes: acquiring a captured image with a first spatial resolution; acquiring a distance image which is depth information with a second spatial resolution that is a resolution lower than the first spatial resolution; extracting an area including a three-dimensional object area corresponding to a three-dimensional object in the captured image; calculating depth information of the three-dimensional object area on the basis of the distance image; correcting coordinate transformation information for coordinate transformation of the captured image on the basis of the calculated depth information of the three-dimensional object area; and generating a viewpoint transformed image obtained by the coordinate transformation of the captured image by using the coordinate transformation information corrected by the correction.

Advantageous Effects of the Invention

A high-precision viewpoint transformed image can be generated by using the distance information with low spatial resolution according to the present invention.

BRIEF DESCRIPTION OF DRAWINGS

FIG. 1 is a hardware configuration diagram of an image processing apparatus 100;

FIG. 2A is a conceptual diagram of a distance image acquired from a distance detection unit 14;

FIG. 2B is a conceptual diagram of a distance image acquired by using a distance sensor having ideal high spatial resolution;

FIG. 2C is a diagram illustrating a relationship between shading and distances;

FIG. 8 is a diagram illustrating an example of corrections of the table data 121 according to the first embodiment;

FIG. 10A is a diagram in which the vicinity of the reference numeral 911 in FIG. 9B is enlarged and on which the outline of a tree 21 is superimposed;

FIG. 10B is a diagram illustrating boundaries between areas with different distances in FIG. 10A;

FIG. 10C is a diagram illustrating coordinate corresponding pixels of the table data 121 superimposed on FIG. 10B;

FIG. 10D is a diagram illustrating a tree with corrected distance information;

FIG. 14A is a diagram illustrating a case where coordinate corresponding points are set sparsely relative to the outline;

FIG. 14B is a schematic diagram illustrating ideal depth information between P and Q in FIG. 14A;

FIG. 14C is a schematic diagram illustrating depth information between P and Q in FIG. 14A;

FIG. 17 is a diagram illustrating an example of corrections of the table data 121 according to the second embodiment.

DESCRIPTION OF EMBODIMENTS

First Embodiment

Figure 3:
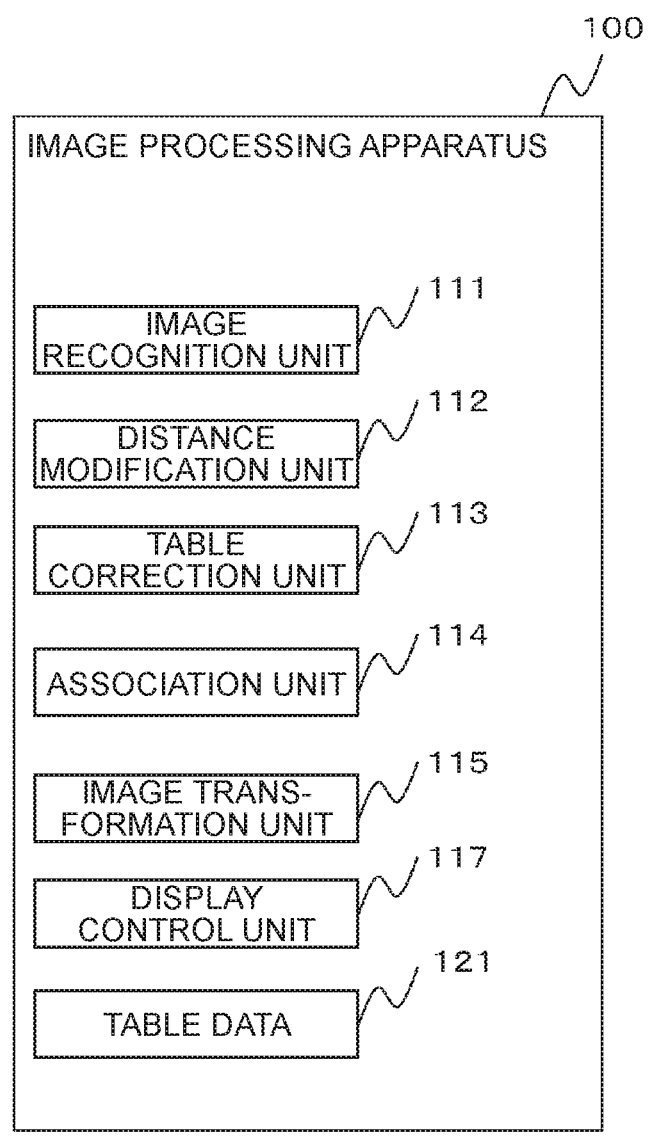
FIG. 3 is a functional block diagram of the image processing apparatus 100 according to a first embodiment.

A first embodiment of an image processing apparatus will be explained with reference to FIG. 1 to FIG. 12.

FIG. 1 is a hardware configuration diagram of an image processing apparatus 100 mounted in a vehicle 20. The vehicle 20 includes the image processing apparatus 100, a front camera 10A, a left camera 10B, a right camera 10C, a rear camera 10D, a display unit 13, and a distance detection unit 14. The front camera 10A, the left camera 10B, the right camera 10C, and the rear camera 10D will be hereinafter collectively referred to as a camera(s) 10. An image(s) captured and thereby obtained by the camera 10 will be referred to as a captured image(s). Resolution of the captured image is determined by, for example, the number of image sensors built in the camera 10 and the captured image has, for example, the resolution of 1920×1080. The resolution will be hereinafter sometimes referred to as spatial resolution.

The camera 10 and the distance detection unit 14 operate in synchronization with each other and acquire information of the surroundings at the same timing. The image processing apparatus 100 outputs an image which is obtained when a virtual camera is installed at a virtual position (hereinafter referred to as the virtual viewpoint) different from an installed position of the camera(s) 10 to capture an image of the surroundings of the vehicle 20 (hereinafter referred as the viewpoint transformed image) by using an image captured by the camera 10, to the display unit 13. The mounting position and mounting attitude of the camera(s) 10 in the vehicle 20 are already known and stored in a storage unit 104.

The display unit 13 is a display unit for a car navigation apparatus built in, for example, an LCD display, a projector, or the vehicle 20. The display unit 13 displays information which is output from an interface 105.

The distance detection unit 14 detects depth information of objects around the vehicle as information with resolving power in a horizontal direction and a vertical direction, that is, two-dimensional resolving power. The distance detection unit 14 is, for example, LIDAR (Light Detection and Ranging). The distance information with the two-dimensional resolving power acquired by the distance detection unit 14 will be hereinafter referred to as a "distance image(s)." A visual field of the distance detection unit 14 overlaps with at least a part of the camera(s) 10. In this embodiment, it is assumed that a visual field of the front camera 10A corresponds with the visual field of the distance detection unit 14. However, the resolution of a distance image acquired by the distance detection unit 14 is lower than the resolution of the camera 10. For example, when the camera 10 has the resolution of 1920×1080 in the horizontal direction x the vertical direction, the distance detection unit 14 has the resolution of 25×25. Specifically speaking, when the spatial resolution of a captured image(s) is called a first spatial resolution and the spatial resolution of a distance image(s) is called a second spatial resolution, the second spatial resolution is lower than the first spatial resolution. Incidentally, the resolving power in a depth direction of the distance image will be hereinafter referred to as the "distance resolving power," which is distinguished from the spatial resolution. It should be noted that the mounting position and mounting attitude of the distance detection unit 14 in the vehicle 20 are already known and stored in the storage unit 104.

FIG. 2A is a conceptual diagram of a distance image acquired by the distance detection unit 14; FIG. 2B is a conceptual diagram of a distance image acquired by using a distance sensor with an ideal high spatial resolution; and FIG. 2C is a diagram illustrating the relationship between shading and distances in FIG. 2A and FIG. 2B. However, the distance sensor with the high resolution for capturing the image of FIG. 2B is indicated for illustrative purposes only and is not mounted in the aforementioned vehicle 20. FIG. 2A and FIG. 2B are the conceptual diagrams of the distance images acquired by the distance detection unit 14 and the ideal distance sensor which are installed on the land where no obstacle exists, towards the horizontal line. Specifically speaking, the lower part of the diagram is the vicinity and indicates that the distance is close; and the upper part of the diagram is the horizontal line or the sky and indicates that the distance is long.

In each of FIG. 2A and FIG. 2B, the upper end is black and the lower end is white. However, the way its density changes differ from each other. In FIG. 2A, the density changes in a stepwise manner as illustrated in a graph on the right end; and in FIG. 2B, the density changes continuously. This is because the apparatus which has acquired the information of FIG. 2B has higher spatial resolution. Accordingly, this embodiment uses a sensor with a low spatial resolution, but can obtain the result close to the case of using the sensor with the high spatial resolution as illustrated in FIG. 2B by employing a contrivance described later. Explanation continues referring back to FIG. 1.

The image processing apparatus 100 includes a CPU 101, a ROM 102, a RAM 103, the storage unit 104, and the interface 105. The CPU 101 is a central processing unit and exhibits functions described later by expanding programs, which are stored in the ROM 102, on the RAM 103 and executing them. The storage unit 104 is a nonvolatile storage device and is, for example, a flash memory or hard disk drive. The interface 105 is an information entrance/exit of the image processing apparatus 100 with other apparatuses and information which is input into the interface 105 is output to the CPU 101. The image processing apparatus 100 acquires the captured image(s) acquired by the camera 10 and the distance image(s) acquired by the distance detection unit 14 by using this interface 105 and inputs them to the CPU 101. The interface 105 is a serial port or the like and may include an AD converter or the like.

FIG. 3 is a functional block diagram which represents functions of the image processing apparatus 100 as functional blocks. The image processing apparatus 100 includes, as its functions, an image recognition unit 111, a distance modification unit 112, a table correction unit 113, an association unit 114, an image transformation unit 115, and a display control unit 117. Table data 121 illustrated in FIG. 3 is information stored in the storage unit 104. The table data 121 is a lookup table used when generating a viewpoint transformed image(s) such as a high-angle image(s) or a bird's-eye image(s). The table data 121 is created in advance in a stage for designing the system including the image processing apparatus 100 according to the positions, angles, and image capturing conditions of the cameras 10 installed in the vehicle 20 and the virtual viewpoint. The table data 121 exists for each visual point which performs viewpoint transformation with respect to each camera 10; however, only one virtual viewpoint of the certain camera 10A will be explained below.

The image recognition unit 111 uses an image captured by the camera 10 as a processing target, extracts the outline of each object included in the captured image, and executes segmentation processing for dividing the captured image into a plurality of areas. Incidentally, in the following explanation, each area which is set within the captured image by the segmentation processing executed by the image recognition unit 111 will be referred to as a "segment." Regarding the extraction of the outlines of the objects in this processing, it is possible to adopt known methods based on the outline detection and a method of analyzing color information of the captured image, dividing the captured image into a plurality of areas on the basis of similarities in the luminance, hue, color saturation, and brightness, and extracting the outline of each area. When a segment corresponding to a three-dimensional object, that is, an area in which the object is a three-dimensional object exists in the recognition result of the image recognition unit 111, the distance modification unit 112 corrects the distance, which is a value measured by the distance detection unit 14, by targeting each coordinate corresponding point described later with respect to the relevant segment. The distance corrected by the distance modification unit 112 will be hereinafter referred to as the "three-dimensional object distance." The table correction unit 113 rewrites the table data 121 by using the three-dimensional object distance calculated by the distance modification unit 112.

The association unit 114 associates a captured image(s) with a distance image(s) on the basis of the mounting positions and mounting attitudes of the camera 10 and the distance detection unit 14 in the vehicle 20, which are stored in the storage unit 104. For example, the association unit 114 calculates an area in the distance image corresponding to a certain area in the captured image. However, in this embodiment, the visual field of the camera 10A corresponds with the visual field of the distance detection unit 14 as described earlier. Therefore, the images captured by the camera 10A can be easily associated with the distance images. The image transformation unit 115 transforms the images captured by the camera 10 by using the table data 121 rewritten by the table correction unit 113 and generates a viewpoint transformed image by combining the respective images captured by the camera 10. The display control unit 117 outputs the viewpoint transformed image generated by the image transformation unit 115 and has the display unit 13 output and display the viewpoint transformed image.

(Operating Environment)

Figure 4:
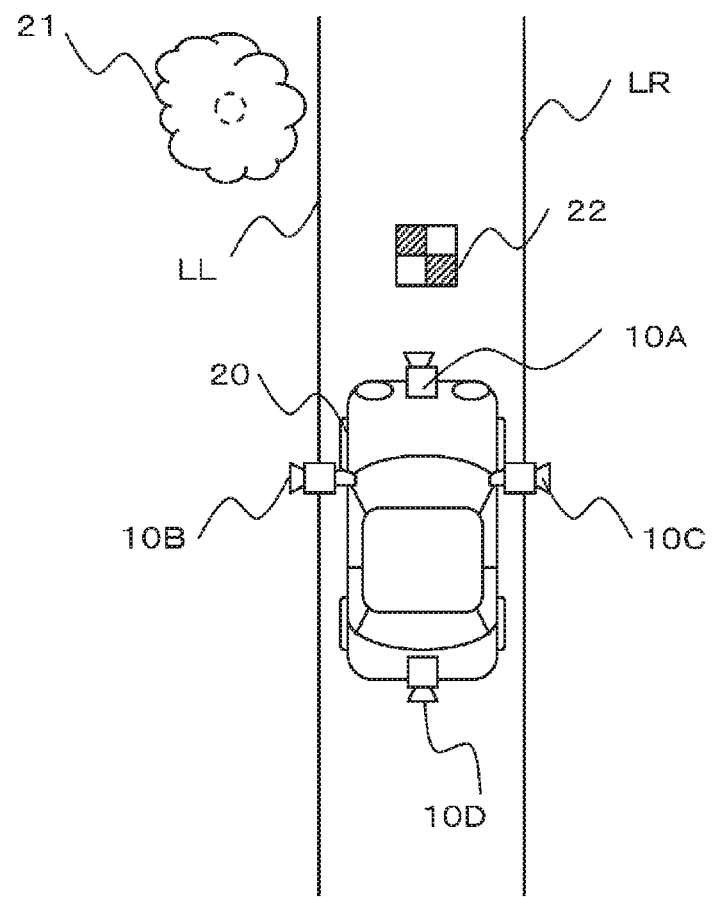
FIG. 4 is a diagram of a vehicle 20 equipped with the image processing apparatus 100 as viewed from above.
Figure 5:
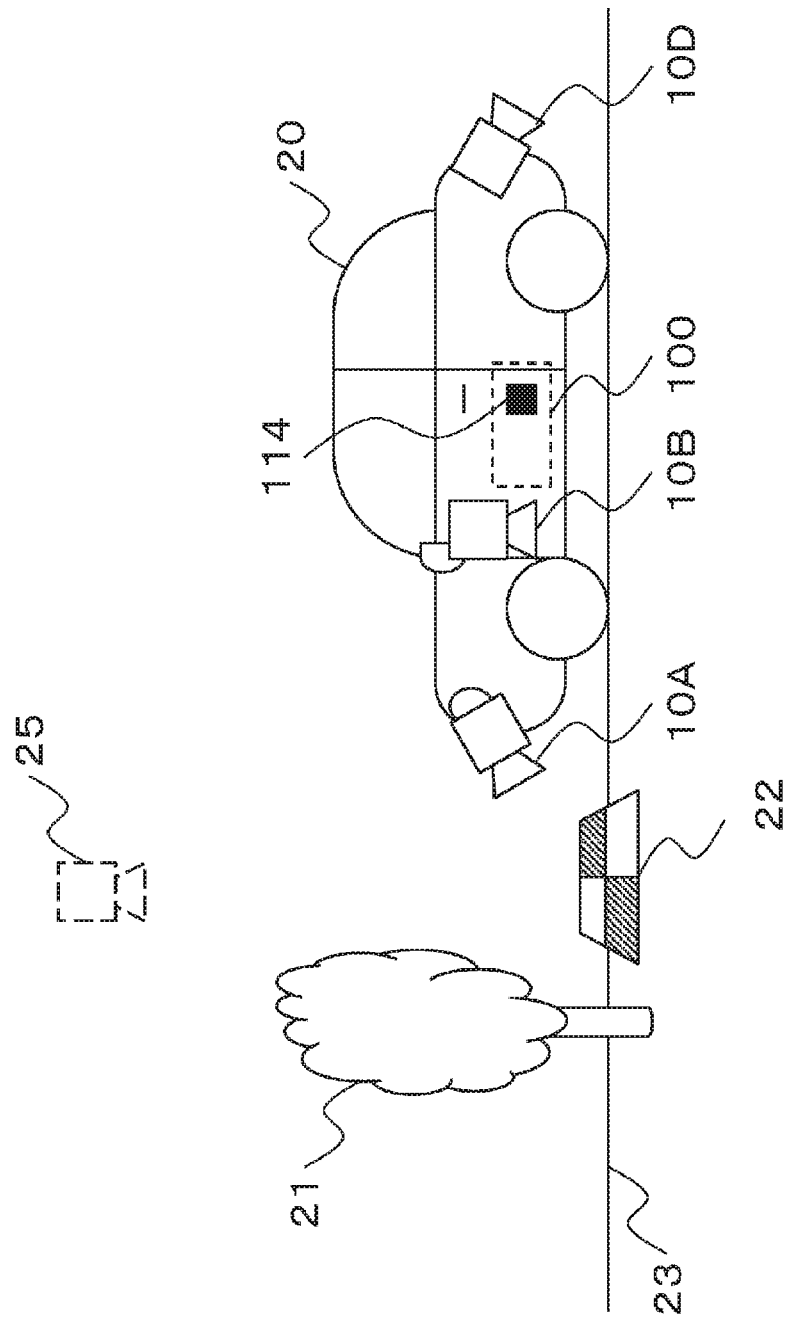
FIG. 5 is a diagram of the vehicle 20 as viewed from its lateral side.

FIG. 4 and FIG. 5 are diagrams for explaining the environment where the image processing apparatus 100 operates. FIG. 4 is a diagram illustrating the vehicle 20, as viewed from above, in which the image processing apparatus 100 is mounted; and FIG. 5 is a diagram illustrating the vehicle 20 as viewed from its lateral side. The vehicle 20 exists in an area between a straight line LL and a straight line LR which are white lines indicating a vehicular lane. A marker 22 is set on the ground in front of the vehicle 20 and there is a tree, that is, a three-dimensional object 21 on the left ahead of the vehicle 20.

The front camera 10A is installed at the front part of the vehicle 20 and its optical axis is set towards a road surface in front of the vehicle 20, and the tree 21 which is the three-dimensional object and the marker 22 on the road surface are included within its image capturing range. Similarly, the left camera 10B, the right camera 10C, and the rear camera 10D are installed on the left part, the right part, and the rear part of the vehicle 20, respectively, and their optical axes are set towards road surfaces on the left side, the right side, and the rear side of the vehicle 20, respectively. The camera 10 includes a wide-angle lens and each lens has an angle of view of approximately 180 degrees. Installed positions and installed angles of the cameras 10 and the distance detection unit 14 are determined in advance in the stage of designing the vehicle 20 and are already known.

A virtual viewpoint 25 indicated in FIG. 5 is a viewpoint for capturing images of an area directly below the viewpoint from above the front of the vehicle 20 and takes a downward view of the front of the vehicle 20. A method for creating an image(s) acquired from the virtual viewpoint 25 in the situation illustrated in FIG. 5 will be explained below. It should be noted that the image processing apparatus 100 includes the cameras 10A to 10D, but a case where an image(s) captured by the front camera 10A is transformed will be explained as a representative case.

The method for creating the image(s) acquired from the virtual viewpoint 25 will be explained.

(Coordinate Transformation)

Figure 6:
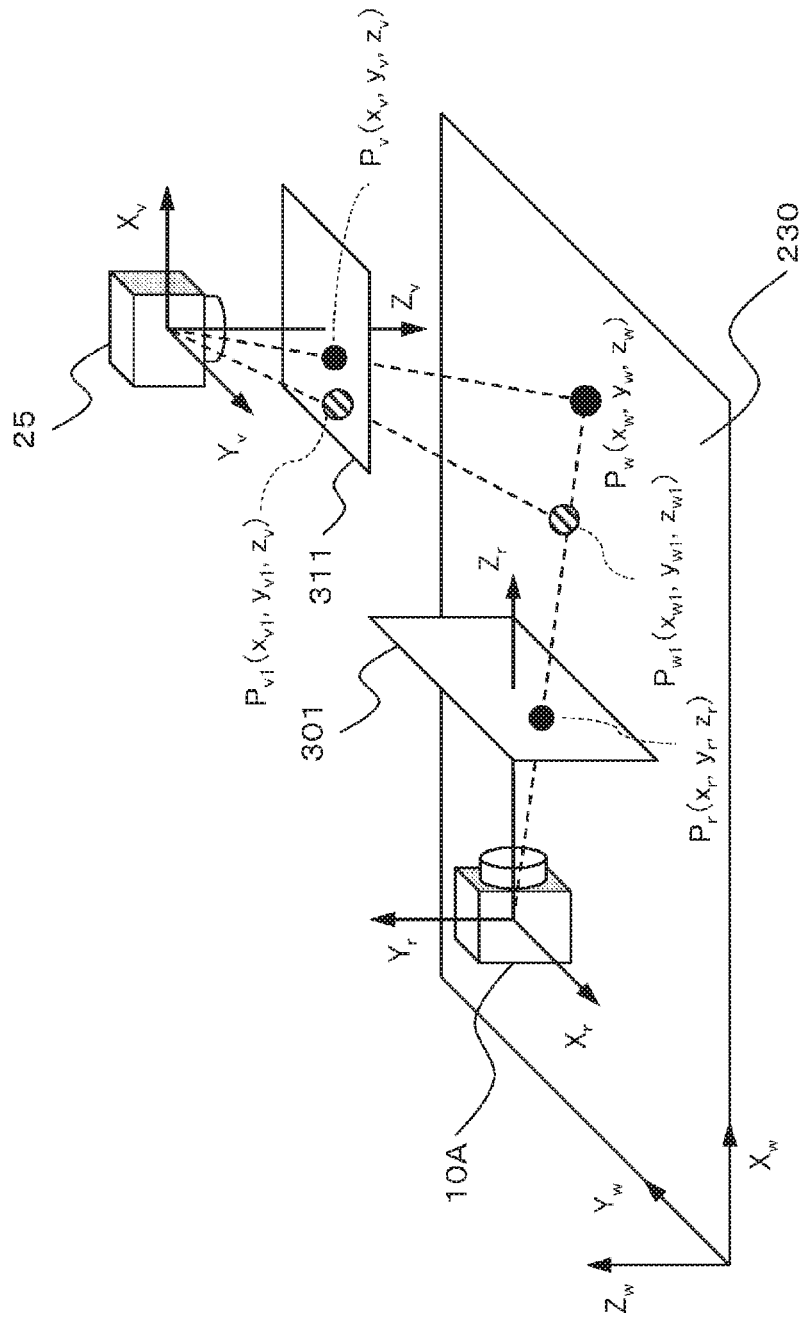
FIG. 6 is a diagram illustrating definitions of a camera coordinate system, a virtual viewpoint coordinate system, and a world coordinate system.

FIG. 6 is a diagram illustrating definitions of a camera coordinate system, a virtual viewpoint coordinate system, and a world coordinate system. The camera coordinate system is a coordinate system based on the camera for capturing images. FIG. 6 illustrates three axes, that is, $X_r$, $Y_r$, and $Z_r$ of the camera coordinate system R based on the front camera 10A. The virtual viewpoint coordinate system is a coordinate system based on a predetermined virtual viewpoint. FIG. 6 illustrates three axes, that is, $X_v$, $Y_v$, and $Z_v$ of the virtual viewpoint coordinate system V based on the virtual viewpoint 25. The world coordinate system is a coordinate system which is set based on the road surface on which the vehicle 20 travels. FIG. 6 illustrates three axes, that is, $X_w$, $Y_w$, and $Z_w$ of the world coordinate system W. $X_w$ and $Y_w$ are parallel to the road surface and the road surface is included in a reference height plane 230 with $Z_w=0$.

$Z_r$ which is one axis of the camera coordinate system R corresponds with the optical axis of the front camera 10A, that is, it is perpendicular to the image sensor; and $X_r$ and $Y_r$ which are other two axes are parallel to a long side and short side of an image sensor for the front camera 10A. When a focal length $z_r$ of the camera is used to express the position of each of pixels constituting a captured image 301, the position of such each pixel can be expressed with coordinate data on the $X_r Y_r$ plane located at $Z_r=z_r$. Specifically speaking, the camera coordinate system R is equivalent to the coordinate system for the captured image 301.

$Z_v$ which is one axis of the virtual viewpoint coordinate system corresponds with an optical axis of a virtual camera placed at the virtual viewpoint 25, that is, it is perpendicular to a virtual image sensor; and $X_v$ and $Y_v$ which are other two axes are parallel to a long side and short side of the virtual image sensor. When a focal length $z_v$ of the camera placed at the virtual viewpoint 25 is used to express the position of each of pixels constituting a viewpoint transformed image 311, the position of such each pixel can be expressed with coordinate data on the $X_v Y_v$ plane located at $Z_v=z_v$. Specifically speaking, the virtual viewpoint coordinate system V is equivalent to the coordinate system for the viewpoint transformed image 311.

A certain point P is called $P_w$ in the world coordinate system W and its coordinates are expressed as $(x_w, y_w, z_w)$. The point P in a captured image when the point $P_w$ is captured by the front camera 10A is called $P_r$ and coordinates of the point $P_r$ are expressed as $(x_r, y_r, z_r)$. The point P in an image acquired from the virtual viewpoint 25 is called $P_v$ and coordinates of $P_v$ are expressed as $(x_v, y_v, z_v)$.

In order to perform coordinate transformation from the coordinates $x_w, y_w$, of the point $P_w$ in the world coordinate system W to the coordinates $(x_r, y_r, z_r)$ of the point $P_r$ in the camera coordinate system R, for example, affine transformation as indicated in Expression (1) is used.

[Math. 1]

$$\begin{bmatrix} x_r \\ y_r \\ z_r \\ 1 \end{bmatrix} = M_r \begin{bmatrix} x_w \\ y_w \\ z_w \\ 1 \end{bmatrix} \quad \text{Expression (1)}$$

In the above expression, $M_r$ is a perspective projection transformation matrix of 4×4 as indicated in Expression (2).

[Math. 2]

$$M_r = \begin{bmatrix} R_r & T_r \\ 0 & 1 \end{bmatrix} \quad \text{Expression (2)}$$

Regarding Expression (2), $R_r$ is a rotating matrix of 3×3, $T_r$ is a translation matrix of 1×3, and 0 is a zero matrix of 3×1. The rotating matrix $R_r$ and the translation matrix $T_r$ are calculated by a well-known method based on, for example, the installed position and installed angle of the camera 10A in the world coordinate system, and the focal length and an effective pixel size of the image sensor, which are internal parameters of the camera 10A.

Furthermore, in order to perform the coordinate transformation from the coordinates $(x_w, y_w, z_w)$ of the point $P_w$ in the world coordinate system W to the coordinates $(x_v, y_v, z_v)$ of the point $P_v$ in the virtual viewpoint coordinate system V, for example, the affine transformation is used as indicated in Expression (3).

[Math. 3]

$$\begin{bmatrix} x_v \\ y_v \\ z_v \\ 1 \end{bmatrix} = M_v \begin{bmatrix} x_w \\ y_w \\ z_w \\ 1 \end{bmatrix} \quad \text{Expression (3)}$$

In the above expression, $M_v$ is a perspective projection transformation matrix of 4×4 as indicated in Expression (4).

[Math. 4]

$$M_v = \begin{bmatrix} R_v & T_v \\ 0 & 1 \end{bmatrix} \quad \text{Expression (4)}$$

Regarding Expression (4), $R_v$ is a rotating matrix of 3×3, $T_v$ is a translation matrix of 1×3, and 0 is a zero matrix of 3×1. The rotating matrix $R_v$ and the translation matrix $T_v$ are calculated by a well-known method based on, for example, the position and angle of the virtual viewpoint 25 in the world coordinate system, the virtual focal length of the virtual viewpoint 25, and the effective pixel size of the image sensor.

Expression (1) and Expression (3) are combined together to obtain Expression (5) for performing the coordinate transformation from the coordinates of the point $P_r$ in the camera coordinate system R to the coordinates of the point $P_v$ in the virtual viewpoint coordinate system V.

[Math. 5]

$$\begin{bmatrix} x_v \\ y_v \\ z_v \\ 1 \end{bmatrix} = M_v M_r^{-1} \begin{bmatrix} x_r \\ y_r \\ z_r \\ 1 \end{bmatrix} \quad \text{Expression (5)}$$

Expression (5) performs the coordinate transformation, by means of an inverse matrix of the perspective projection transformation matrix $M_r$, from the coordinates of the point $P_r$ in the camera coordinate system R to the coordinates of the point $P_w$ in the world coordinate system and performs the coordinate transformation, by means of the perspective projection transformation matrix $M_v$, from the coordinates of the point $P_w$ to the coordinates $(x_v, y_v, z_v)$ of the point $P_v$ in the virtual viewpoint coordinate system V. A pixel value of the point $P_v$ in the viewpoint transformed image 311 can be calculated from a pixel value of the point $P_r$ in the corresponding captured image 301 by using the coordinate transformation result of Expression (5).

However, the distance information to the object cannot be obtained from the image captured by the camera 10, so that the pixel value of the point $P_v$ in the viewpoint transformed image 311 can be calculated by assuming, for example, that the point $P_w$ is located on the road surface, that is, on the plane with $z_w=0$. Then, the pixel value of the point $P_v$ in the viewpoint transformed image 311 is calculated again for only an area for which an image of an object that is not located on the road surface is captured. For example, if the point $P_r$ in the captured image 301 is not the point $P_w$ on the road surface, but is a point $P_{w1}$ existing on the plane with $Z_w=z_{w1}(\neq 0)$, its corresponding point in the viewpoint transformed image 311 is not the point $P_v$, but a point $P_{v1}$. Whether the object in the image captured by the camera 10 exists on the road surface or not can be determined based on the distance to the object. Furthermore, if the object does not exist on the road surface, its corresponding point in the viewpoint transformed image 311 can be calculated by using the distance information.

An example of the calculation of the corresponding point will be explained with reference to FIG. 6; and the coordinates of the point $P_{w1}$ are firstly calculated by using a geometric relationship between an origin position of the camera coordinate system R in the world coordinate system and the coordinates of the point $P_r$, and the distance information to the object as calculated by the distance modification unit 112. Specifically speaking, an X-coordinate and a Y-coordinate of the point at the position of the point $P_{w1}$ on the reference height plane and a value of $z_{w1}$ that is a Z-coordinate of the point $P_{w1}$ which is the height of the object from the reference height plane 230 are calculated. Then, the coordinates of the corresponding point $P_{v1}$ in the viewpoint transformed image 311 are calculated from the position of the camera 25 and the calculated position of the point thereby correcting the table data 121.

(Table Data 121)

Each piece of the table data 121 stored in the storage unit 104 describes a plurality of sets of correspondence relationships between points $P_r$ in the captured image and points $P_v$ in the viewpoint transformed image, which are calculated in advance by assuming that all objects exist on the road surface. In other words, the table data 121 are calculated on the premise that the objects exist within the reference height plane 230. Specifically speaking, the coordinates $(x_{r1}, y_{r1})$ of a specified point $P_{r1}$, coordinates $(x_{r2}, y_{r2})$ of $P_{r2}$, and so on in the camera coordinate system R are respectively transformed into the coordinates of their corresponding points in the virtual viewpoint coordinate system V, which are obtained by the aforementioned Expression (5) Under this circumstance, the correspondence relationship between the points in the two coordinate system, that is, the corresponding relationship between pixels will be referred to as coordinate corresponding information and this coordinate corresponding information is created as the table data 121. Incidentally, regarding the table data 121, information of the $Z_r$ coordinate is omitted by considering that the focal length or the like of the camera 10A is fixed.

In the following explanation, pixels whose coordinate corresponding information is stored in the table data 121, among the pixels of the captured image(s) 301 and the viewpoint transformed image(s) 311, will be referred to as coordinate corresponding pixels or coordinate corresponding points. Specifically speaking, a plurality of coordinate corresponding points are set in the captured image(s) 301 and the viewpoint transformed image(s) 311 in advance. By storing the table data 121 in the storage unit 104 in advance and referring to the table data 121 when creating the viewpoint transformed image 311, it is possible to reduce the number of times of arithmetic operations of the aforementioned Expression (5) and reduce processing time for the coordinate transformation. Incidentally, as the coordinate corresponding information stored in the table data 121 in advance increases, a data volume of the table data 121 increases. In order to reduce the data volume of the table data 121, the coordinate corresponding information about only some pixels of the captured image 301 is stored in advance and pixel values of the points $P_v$ are calculated by interpolation processing with respect to other pixels. Incidentally, the table data 121 may be created by considering, for example, distortion of the lens for the camera 10.

The table data 121 is calculated in advance by assuming as described above that all objects exist on the road surface. Therefore, if an object does not exist on the road surface, that is, if the object is a three-dimensional object having a height, it is necessary to perform the calculation based on the distance information and rewrite the table data 121. This rewriting of the table data 121 will be hereinafter sometimes referred to as correction of the table data 121. In this embodiment, the table correction unit 113 corrects the table data 121. Specifically speaking, the table correction unit 113 corrects the coordinate corresponding point(s) included in an area of the three-dimensional object 21 in the table data 121. The coordinate corresponding point(s) which is a target to be corrected will be hereinafter referred to as a "correction target coordinate corresponding point(s)."

Figure 7:
FIG. 7 is a diagram illustrating an example of table data 121.

FIG. 7 is a diagram illustrating an example of the table data 121. The table data 121 is a coordinate correspondence table which defines correspondence relationships between the coordinates of discrete pixels for the captured image 301 and the coordinates of pixels for the viewpoint transformed image 311 corresponding to the above-mentioned coordinates. FIG. 7 indicates the coordinate corresponding information of the respective pixels with the correspondence relationship numbers 1, 2, and so on up to n. The image processing apparatus 100 performs the arithmetic operation of the coordinates of the pixel for the corresponding viewpoint transformed image 311 by referring to the table data 121 with respect to the coordinates of each pixel for the captured image 301.

FIG. 8 is a diagram which extracts the correction target coordinate corresponding points from the table data 121 and illustrates the coordinates before and after the correction. FIG. 8 also shows a three-dimensional object distance which is required to correct the table data 121. Specifically speaking, the table in FIG. 8 is indicated for illustrative purposes only and this table itself does not have to be stored in the RAM 103 or the storage unit 104. In this embodiment, the table correction unit 113 corrects the table data 121 by correcting the coordinate corresponding information about the above-described correction target coordinate corresponding points among the coordinate corresponding information about each coordinate corresponding point in the table data 121. Specifically speaking, regarding the correction target coordinate corresponding points o1, o2, o3, and so on up to oi, their coordinates in the viewpoint transformed image, that is, the coordinates (xv_o1, yv_o1), (xv_o2, yv_o2), (xv_o3, yv_o3), and so on up to (xv_oi, yv_oi) in the virtual viewpoint coordinate system V are respectively corrected to (xv_o1', yv_o1'), (xv_o2', yv_o2'), (xv_o3', yv_o3'), and so on up to (xv_oi', yv_oi'). The table correction unit 113 performs the above-described correction by using the three-dimensional object distance as mentioned earlier.

Assuming that three-dimensional objects are captured in all areas in the image captured by the camera 10A, the coordinates in the viewpoint transformed image with respect to all the coordinate corresponding points in the table data 121 will be rewritten. However, even in this case, the coordinates in the captured image in the table data 121 will not be rewritten.

(Distance Image and Necessity of Correction)

Figure 9B:
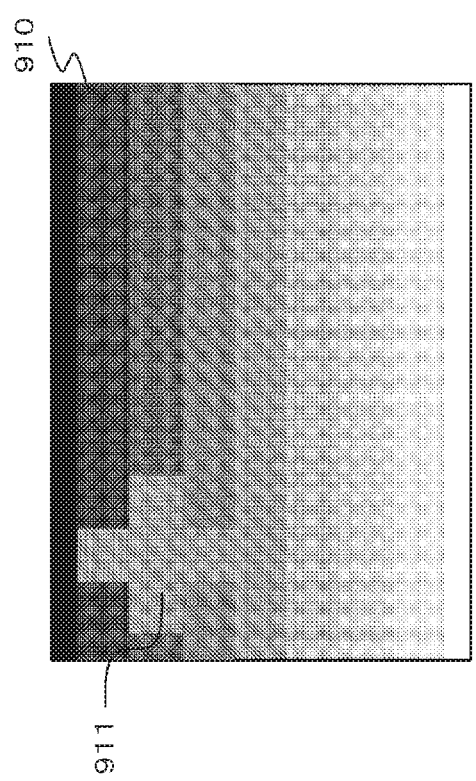
FIG. 9B is a diagram illustrating a distance image 910 acquired by a distance detection unit 14.
Figure 9C:
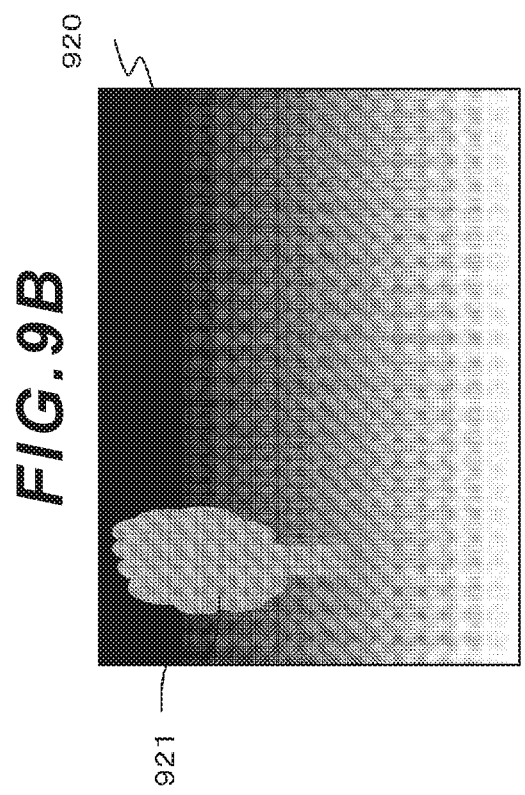
FIG. 9C is a diagram illustrating a distance image 920 acquired by an ideal distance sensor.
Figure 9A:
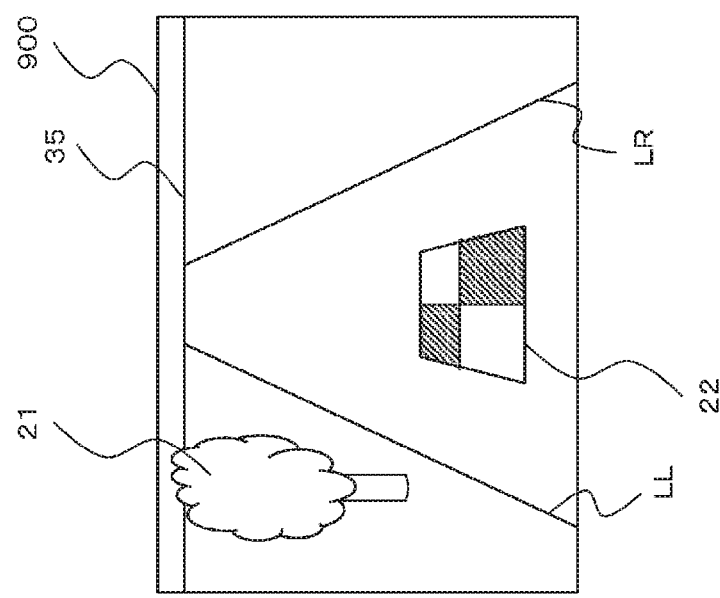
FIG. 9A is a diagram illustrating an image 900 captured by a front camera 10A.

FIG. 9A is a diagram illustrating an image 900 captured by the front camera 10A; FIG. 9B is a diagram illustrating a distance image 910 acquired by the distance detection unit 14; and FIG. 9C is a diagram illustrating a distance image 920 acquired by an ideal distance sensor. In the captured image 900 as illustrated in FIG. 9A, there is a tree 21 which is a three-dimensional object on the left side in the drawing and a white line LL and a white line LR extend from the bottom center of the drawing towards the top of the drawing. Also, there is a marker 22 in the lower part of the drawing and there is a horizontal line 35 in the upper part of the drawing. In the distance image 910 acquired by the distance detection unit 14, the distance to the ground changes in a stepwise manner as indicated in FIG. 2 and the tree 21 is indicated in a cross shape as indicated with the reference numeral 911. This is because the spatial resolution of the distance detection unit 14 is low. Assuming that an ideal distance sensor is used in the same environment, the distance image 920 indicated in FIG. 9C is obtained. In the distance image 920, the tree 21 is indicated as having exactly the shape of the tree 21 as indicated with the reference numeral 921.

FIG. 10A is a diagram in which the vicinity of the reference numeral 911 in FIG. 9B is enlarged and on which the outline of the tree 21 indicated with the reference numeral 21A is superimposed. FIG. 10B is a diagram illustrating boundaries between areas with different distances in FIG. 10A. FIG. 10C is a diagram illustrating coordinate corresponding pixels of the table data 121 superimposed on FIG. 10B. However, the coordinate corresponding pixels in FIG. 10C are indicated in three types, i.e., an x mark, a circle mark, and a triangle mark. The x mark represents a point regarding which appropriate distance information is obtained; the circle mark represents a point which is located farther than an appropriate distance; and a triangle mark represents a point which is located closer than the appropriate distance. For example, the circle mark indicated with the reference numeral 912 is part of the tree 21, so that it should be recognized as having substantially the same distance as other regions of the tree 21.

However, as it is obvious by referring to FIG. 10A, the circle mark 912 is recognized as located farther with a longer distance than that to the tree 21. Furthermore, the point with the triangle mark indicated with the reference numeral 913 is a point in the ground, not the tree 21, with reference to FIG. 10A and FIG. 8, so that that point should be recognized as being located farther than the tree 21. However, the triangle mark 913 is recognized as having the same distance as that to the tree 21. Therefore, the distance modification unit 112 corrects the distance information by processing described later as indicated in FIG. 10D. Specifically speaking, since the three-dimensional object distance indicated in FIG. 8 is calculated by the distance modification unit 112, the table correction unit 113 corrects the table data 121 by using this three-dimensional object distance. Consequently, appropriate transformation is performed with respect to all the coordinate corresponding pixels of the table data 121, (Operation Example of Image Recognition Unit)

Figure 11B:
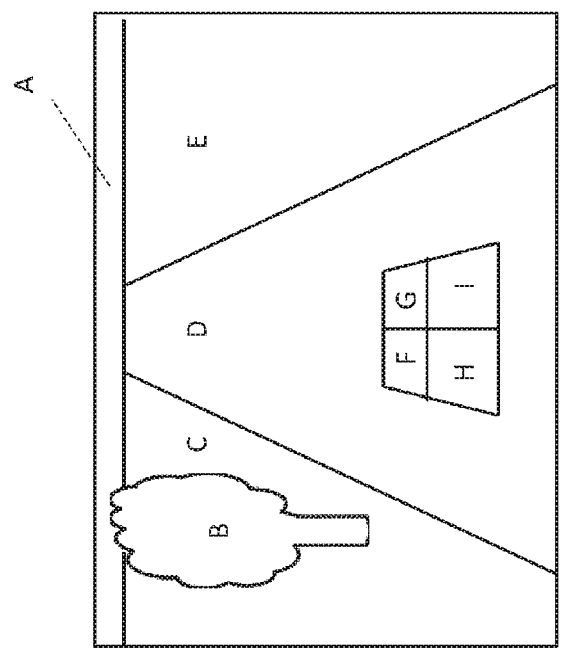
FIG. 11B is a diagram in which signs are assigned to segments.
Figure 11A:
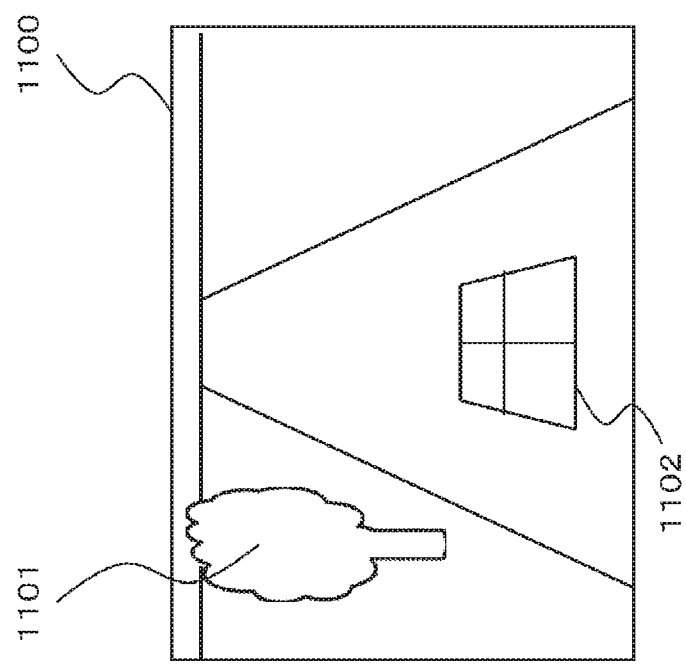
FIG. 11A is a diagram illustrating an example of segmentation.

An operation example of the image recognition unit 111 will be explained with reference to FIG. 9A and FIG. 11. The image recognition unit 111 uses the image captured by the camera 10A as illustrated in FIG. 9A as a processing target and divides the captured image into a plurality of areas, that is, segments by segmentation processing via, for example, a means of using the aforementioned color information. Referring to FIG. 11A, the tree 21 is recognized as one area indicated with the reference numeral 1101 and the marker 22 is recognized as four areas as indicated with the reference numeral 1102. FIG. 11B is a diagram in which signs are assigned to the respective segments illustrated in FIG. 11A for convenience sake. The captured image is divided into nine segments A to I by the image recognition unit 111 as illustrated in FIG. 11B. However, this segmentation does not distinguish between the three-dimensional object and the road surface.

(Operation of Distance Modification Unit)

The distance modification unit 112 modifies the distances of the coordinate corresponding points within the relevant segment with respect to each segment by any one of the following three methods. A first method is a simple average. The distance modification unit 112 calculates an average value of the distance information of all the coordinate corresponding points within the relevant segment and decides this average value as the three-dimensional object distance of all the coordinate corresponding points within the processing target segment. Specifically speaking, if the first method is employed, all the coordinate corresponding points within the relevant segment has the same three-dimensional object distance.

A second method is primary approximation. The distance modification unit 112 approximates the correlation between coordinate values and the distance information of each coordinate corresponding point within the segment via a linear function. Then, the distance modification unit 112 decides the three-dimensional object distance of each coordinate corresponding point on the basis of its approximate equation. Specifically speaking, if the second method is employed, for example, it is possible to accurately calculate, for example, the distance of a wall facing obliquely to the vehicle 20. A third method is multidimensional approximation. The third method is to use a multidimensional function which is a quadratic or higher function for the approximation for the second method. If the third method is employed, the distance of an object having a complicated shape can also be calculated accurately.

(Operation of Image Processing Apparatus)

Figure 12:
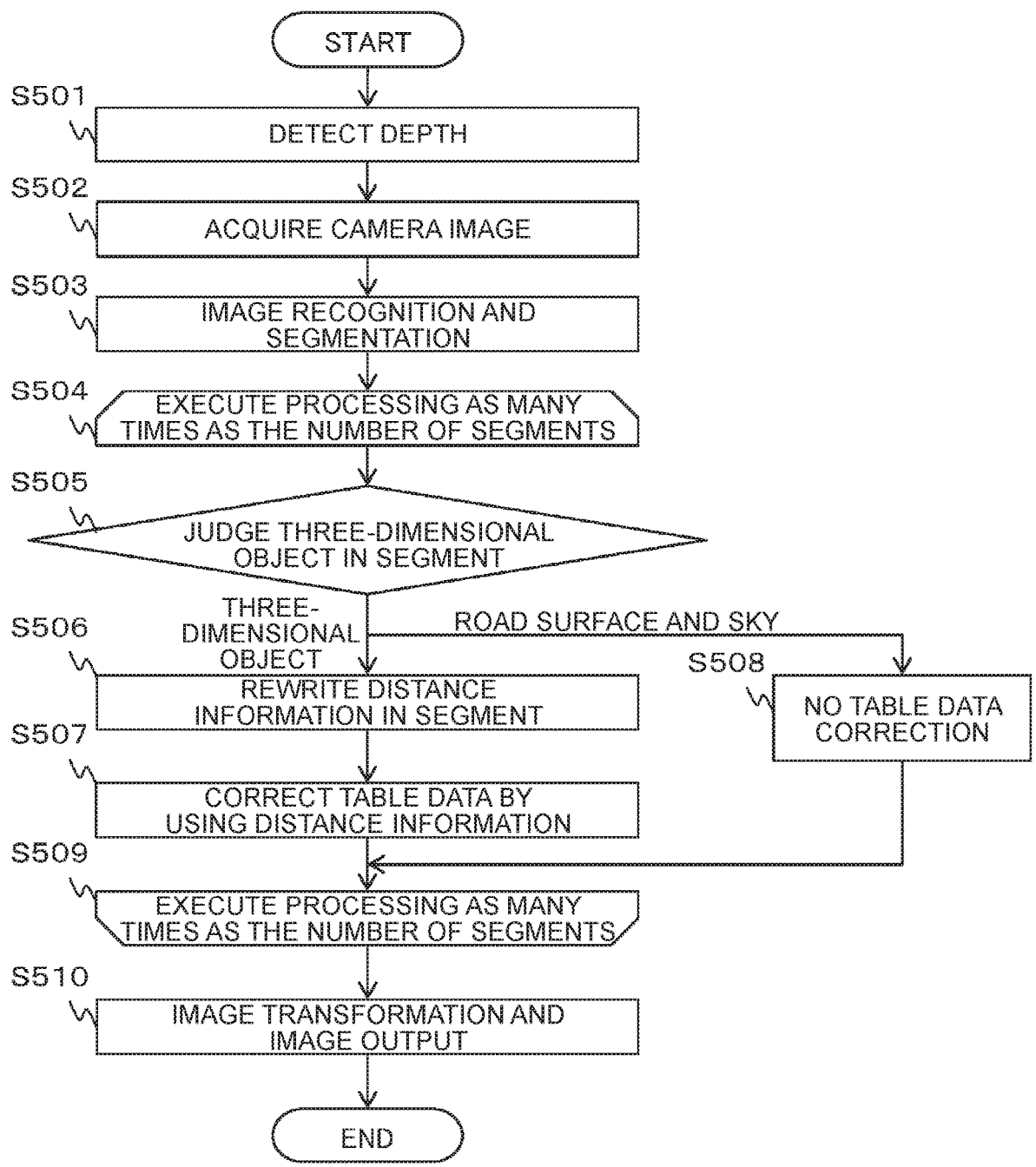
FIG. 12 is a flowchart illustrating operations of the image processing apparatus 100 according to the first embodiment.

The operation of the image processing apparatus 100 when displaying the viewpoint transformed image on the display unit 13 will be explained with reference to FIG. 12. The execution of the operation of the image processing apparatus 100 which will be explained below is started at every specified time period, for example, every 16 ms. The execution subject of each step of the processing described below is the CPU 101.

Firstly in step S501, the CPU 101 acquires the captured image from the camera from the distance detection unit 14. In the next step S502, the CPU 101 acquires the captured image from the camera 10. In the subsequent step S503, the CPU 101 causes the image recognition unit 111 to process the distance image acquired in step S502 and execute segmentation. An execution example of this step is as explained with reference to FIG. 11. In the subsequent step 3504, the CPU 101 executes steps S505 to S508 explained below on each of segments calculated in 3503. The processing of S505 to 3508 may be executed in parallel with respect to all the segments; however; an explanation will be provided here by changing the processing target and processing it one by one in sequential order. Also, a segment which is a target to be processed will be referred to as a processing target segment.

In step S505, the CPU 101 judges whether the relevant segment is an area corresponding to the three-dimensional object or an area corresponding to the road surface, on the basis of the distance information within the processing target segment. This judgment can be performed, for example, as described below. Specifically speaking, since the mounting position and mounting attitude of the camera 10A are already known; the relationship between the position and the distance within the captured image can be calculated in advance by the association unit 114, assuming that an object whose image should be captured is the road surface. Then, by comparing the difference between the distance information within the segment and the aforementioned distance calculated from the position of that segment in the captured image, it is possible to judge whether the object in the segment is the road surface or not. If the CPU 101 determines that the object in that segment is the three-dimensional object; the processing proceeds to step S506; and if the CPU 101 determines that the object in that segment is the road surface, the processing proceeds to step S508. Incidentally, if it is determined that the object of the processing target segment is the sky because the distance is infinite or cannot be measured, the processing also proceeds to step S598.

In step S506, the CPU 101 modifies the distance information of all the coordinate corresponding points within the processing target segment by using the distance modification unit 112, that is, calculates the three-dimensional object distance. In the subsequent step S507, the CPU 101 causes the table correction unit 113 to rewrite all the coordinate corresponding points within the processing target segment in the table data 121 and then proceeds to step S509. However, the table data 121 corrected in this step will be discarded after the execution of step S510 described later is completed; and, therefore, the processing of this step is the correction of a temporary copy of the table data 121. In step S508 which is executed when it is determined in step S505 that the processing target segment is the road surface, the CPU 101 proceeds to step S509 without causing the table correction unit 113 to correct the table data 121. Specifically speaking, no special processing is executed in S508, so that the processing may proceed directly to S509 if it is determined that the processing target segment is the road surface.

In step S509 executed after step S507 and step S508, the CPU 101 judges whether all the segments have become processing targets or not. If the CPU 101 determines that any segment which has not become the processing target exists, it sets that segment as the processing target and returns to step S505. If the CPU 101 determines that all the segments have become the processing targets, the processing proceeds to step S510. In step S510, the image transformation unit 115 transforms the image captured by the camera 10 by using the table data 121 corrected in step S507. The, the display control unit 117 outputs this transformed image to the display unit 13 and the processing illustrated in FIG. 12 then terminates.

The following operational advantages can be obtained according to the above-described first embodiment.

(1) The image processing apparatus 100 includes: the interface 105 which acquires the captured image with the first spatial resolution; the interface 105 which acquires the distance image that is the depth information with the second spatial resolution which is a resolution lower than the first spatial resolution; the image recognition unit 111 which extracts an area including a three-dimensional object area corresponding to a three-dimensional object in the captured image; the distance modification unit 112 which calculates the depth information of the three-dimensional object area on the basis of the distance image; the table correction unit 113 which corrects the table data 121, which is the coordinate transformation information for performing the coordinate transformation of the captured image, on the basis of the depth information of the three-dimensional object area calculated by the distance modification unit 112; and the image transformation unit 115 which generates the viewpoint transformed image by the coordinate transformation of the captured image by using the table data 121 corrected by the table correction unit 113. Therefore, the high-precision viewpoint transformed image can be generated by using the distance image which is the distance information with the low spatial resolution.

(2) The image recognition unit 111 extracts the outlines of a plurality of segments including the three-dimensional object area on the basis of at least one of luminance, hue, color saturation, and brightness of the captured image. Therefore, the image recognition unit 111 can easily divide the captured image into the plurality of segments including the three-dimensional object area.

(3) The table data 121 includes a plurality of combinations between the transformation source coordinates in the captured image and the transformation destination coordinates in the viewpoint transformed image. The table correction unit 113 corrects the transformation destination coordinates on the basis of the distance information of the three-dimensional object area in the distance image as illustrated in FIG. 8, that is, corrects the coordinates in the viewpoint transformed image. Therefore, the resolution of the distance image can be enhanced simulatively.

(4) The table data 121 is created on the premise that an object in the captured image is an area on the road surface. The image recognition unit 111 divides the captured image into a plurality of segments with respect to each object included in the captured image. The table correction unit 113 judges whether each of the plurality of segments is the three-dimensional object areas or not (S505 in FIG. 12), on the basis of the distance image; and if it is determined that the relevant segment is the three-dimensional object area, the table correction unit 113 corrects, in the table data 121, the transformation destination coordinates corresponding to the transformation source coordinates within the above-determined segment (S507). Therefore, it is unnecessary to correct the table data 121 with regard to any area which is not the three-dimensional object, so that the processing time can be reduced.

(5) The table data 121 is calculated on the premise that an object(s) in the captured image exists within the reference height plane. The table correction unit 113 calculates the height of the object from the reference height plane 230 and the position of the object on the reference height plane by using the depth information of the three-dimensional object area calculated by the distance modification unit 112. Furthermore, the table correction unit 113 corrects the table data 121 by using the viewpoint transformation reference position, the calculated height of the object from the reference height plane, and the calculated position of the object on the reference height plane.

(Variation 1)

The table data 121 according to the first embodiment shows the correspondence relationship expressed by Expression (5) between the point $P_r$ in the captured image and the point $P_v$ in the viewpoint transformed image. However, the table data 121 may show the correspondence relationship expressed by Expression (1) between the point $P_r$ in the captured image and the point $P_w$ in the three-dimensional space. The table data according to Variation 1 will be hereinafter referred to as the table data 121A in order to distinguish it from the table data 121 according to the first embodiment. In this variation, the shape of the captured image projected onto the three-dimensional space is changed by correcting the table data 121A. The image transformation unit 115 creates an image obtained by capturing the captured image, which is projected onto the three-dimensional space, from the virtual viewpoint, that is, a viewpoint transformed image.

Figure 13:
FIG. 13 is a diagram illustrating an example of the table data 121A of Variation 1.

FIG. 13 is a diagram illustrating an example of the table data 121A. The table data 121A shows the correspondence relationship expressed by Expression (1) between the point $P_r$ in the captured image and the point $P_w$ in the three-dimensional space. However, in this embodiment, all values of the $Z_w$ coordinate of the point $P_w$ in the three-dimensional space are zero in the table data 121A before the correction. Specifically speaking, the table data 121A before the correction shows the correspondence relationship between the point $P_r$ in the captured image 301 and the point $P_w$ on the plane with $Z_w=0$ in the three-dimensional space.

According to this variation, the viewpoint transformed image can be created by using the table data 121A even when a virtual viewpoint which was not assumed in advance is set by a user.

(Variation 2)

In the aforementioned first embodiment, the table data 121 is created in advance by assuming that all objects exist on the road surface. However, the table data 121 does not have to be created in advance, but may be created as needed. In this case, the table data 121 is created by the processing illustrated in FIG. 12. Specifically speaking, the relevant part of the table data 121 is created in step S507 and step S508.

(Variation 3)

In the aforementioned first embodiment, the vehicle 20 includes four cameras, that is, the front camera 10A, the left camera 10B, the right camera 10C, and the rear camera 10D. However, the vehicle 20 may include at least one camera. Also, the vehicle 20 may include five or more cameras.

(Variation 4)

In the aforementioned first embodiment, the image recognition unit 111 divides the captured image into a plurality of areas by executing the segmentation processing and the table correction unit 113 corrects the table data 121 by setting the coordinate corresponding points in an area corresponding to the three-dimensional object, from among the above-mentioned areas, as processing targets. However, the image recognition unit 111 may specify only the area corresponding to the three-dimensional object in the captured image. For example, the area corresponding to the three-dimensional object can be specified in the captured image by extracting a portion of the distance image in which the depth information does not change in a stepwise manner, and specifying an area of the same object corresponding to that portion in the captured image.

Second Embodiment

A second embodiment of the image processing apparatus 100 will be explained with reference to FIG. 14 to FIG. 18. In the following explanation, the difference from the first embodiment will be mainly explained by assigning the same reference numerals to the same constituent elements as those in the first embodiment. The details which will not be particularly explained are the details with the same content as those of the first embodiment. The main difference between this embodiment and the first embodiment is that in this embodiment, the values of coordinates in the captured image in the table data 121 are also modified.

(General Outline of Second Embodiment)

In the first embodiment, the coordinate corresponding points are originally set densely relative to the extracted outline. However, if the coordinate corresponding points are set sparsely relative to the extracted outline, the effect of the first embodiment becomes limited. So, in this embodiment, new coordinate corresponding points are set corresponding to the outline of the extracted three-dimensional object, FIG. 14 shows diagrams indicating a problem which may occur when the first embodiment is applied. FIG. 14A is an example of a case where the coordinate corresponding points are set sparsely relative to the outline. FIG. 14B is a schematic diagram illustrating ideal depth information between P and Q in FIG. 14A; and FIG. 14C is a schematic diagram illustrating the depth information between P and Q in FIG. 14A. However, regarding FIG. 14B and FIG. 14C, the upward direction in the relevant drawing indicates that the distance is longer; and a white circle represents the outline. As illustrated in FIG. 14B, it is desirable that ideally the distance information clearly changes at the outline. However, the distance information is set to only the coordinate corresponding points and the interpolation processing is executed on points between the coordinate corresponding points, so that the distance information will become different from ideal one as indicated in FIG. 14C.

Figures 15A, 15B:
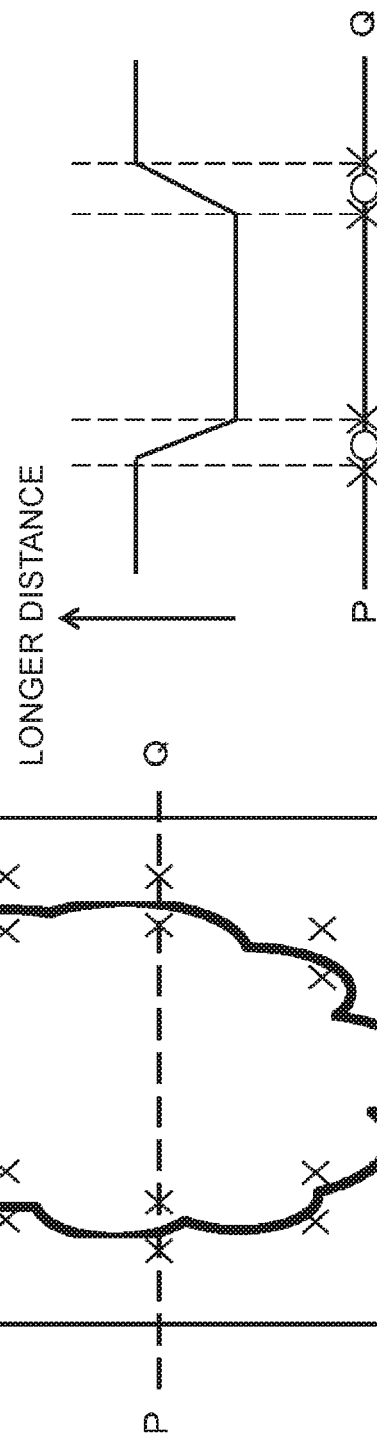
FIG. 15A is a diagram illustrating coordinate corresponding points corrected by a table correction unit 113 according to a second embodiment.
FIG. 15B is a schematic diagram illustrating depth information between P and Q in FIG. 15A.

FIG. 15A is a diagram illustrating the coordinate corresponding points corrected by the table correction unit 113 according to the second embodiment; and FIG. 15B is a schematic diagram illustrating the depth information between P and Q in FIG. 15A. In this embodiment, the coordinate corresponding points are set in the vicinity of the outline of the three-dimensional object area and on both sides of the outline, that is, outside and inside the three-dimensional object area, respectively, as illustrated in FIG. 15A. Accordingly, the distance changes rapidly in the vicinity of the outline as illustrated in FIG. 15B and almost matches the ideal distance as illustrated in FIG. 14B. Incidentally, referring to FIG. 15, there is some space between the outline and each coordinate corresponding point due to illustrative reasons; however, it is desirable that the outline and the coordinate corresponding point should be placed as close to each other as possible.

(Configuration)

The configuration of the image processing apparatus 100 and the hardware configuration of the vehicle 20 according to the second embodiment are the same as those according to the first embodiment. However, the operation of programs stored in the ROM 102 for the image processing apparatus 100 is different as described later.

Figure 16:
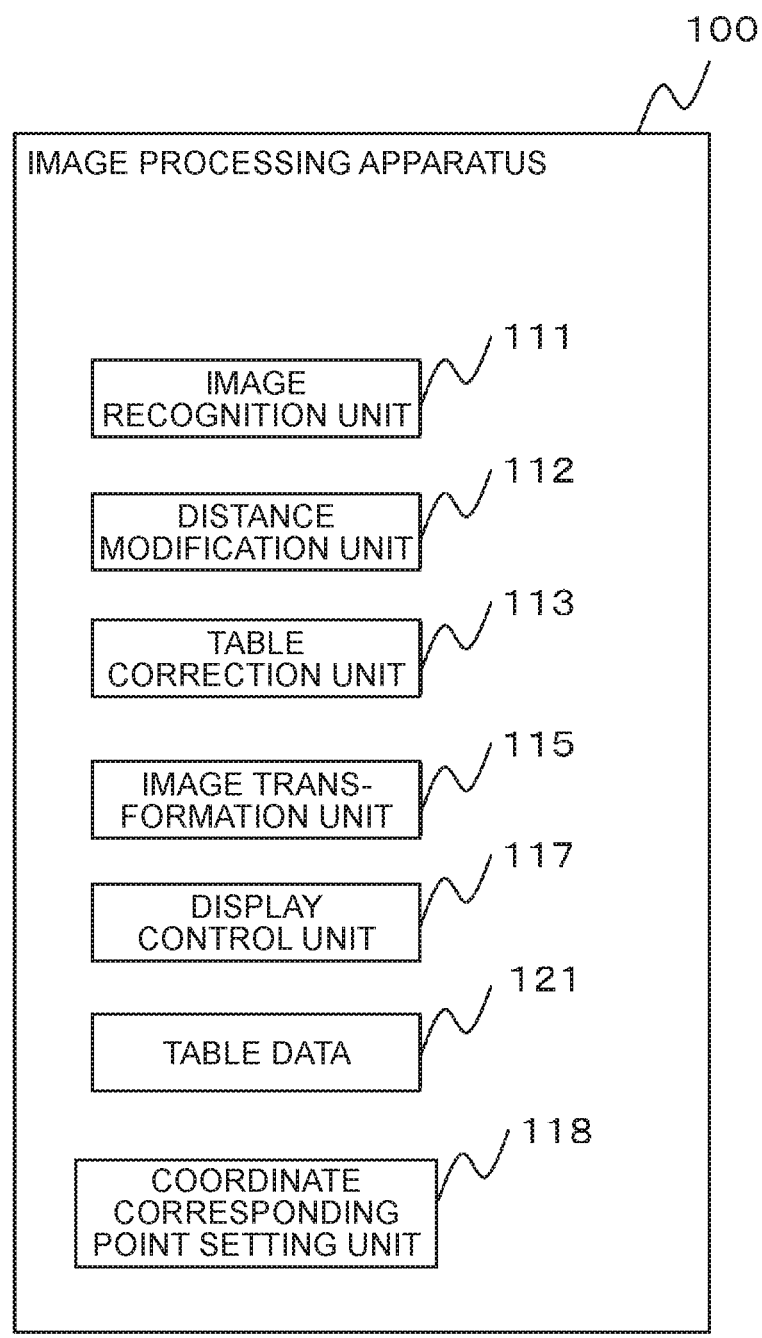
FIG. 16 is a functional block diagram of the image processing apparatus 100 according to a second embodiment.

FIG. 16 is a functional block diagram illustrating functions of the image processing apparatus 100 as functional blocks. The image processing apparatus 100 further includes a coordinate corresponding point setting unit 118 in addition to the functions according to the first embodiment. The coordinate corresponding point setting unit 118 sets the coordinate corresponding points in the vicinity of the outline of a segment divided by the image recognition unit 111. However, the coordinate corresponding point setting unit 118 may modify the coordinates of the existing coordinate corresponding points and may also add new coordinate corresponding points.

(Correction of Table Data)

FIG. 17 is a diagram which extracts the correction target coordinate corresponding points and the newly set coordinate corresponding points from the table data 121 and illustrates the coordinates before and after the correction. FIG. 17 corresponds to FIG. 8 in the first embodiment. The difference from FIG. 8 will be mainly explained below. In the second embodiment, the coordinates in the captured image can also be corrected. For example, regarding the correspondence number "o2" in FIG. 17, both the Xr coordinate and the Yr coordinate of the coordinates in the captured image are corrected; and regarding the correspondence number "o3," the Yr coordinate of the coordinates in the captured image is corrected. Furthermore, regarding the correspondence relationship number "o4," as it is obvious from the fact that it did not exist before the correction, it is a newly set coordinate corresponding point.

(Operation of Image Processing Apparatus)

Figure 18:
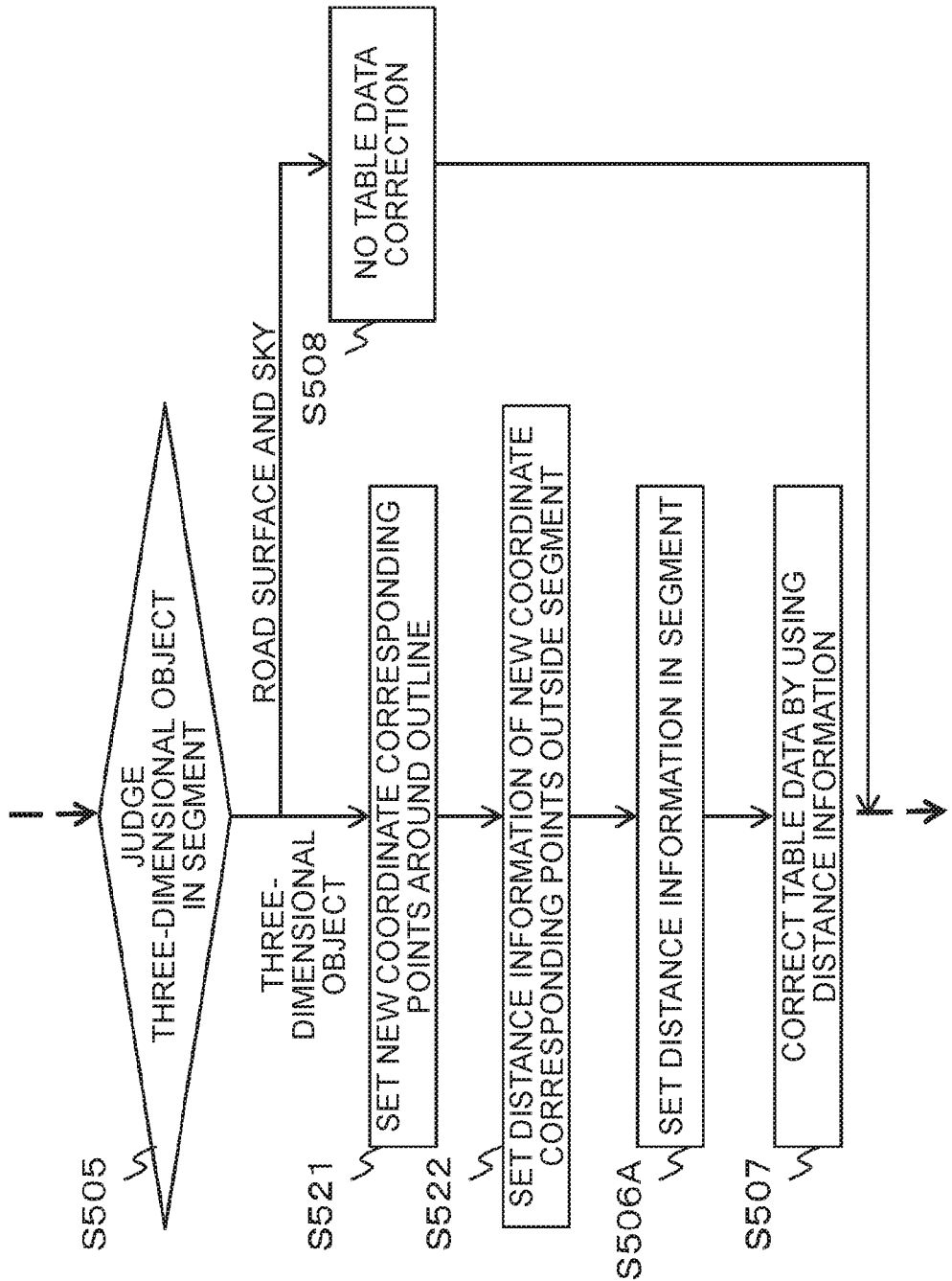
FIG. 18 is a flowchart illustrating operations of the image processing apparatus 100 according to the second embodiment.

The operation of the image processing apparatus 100 according to the second embodiment will be explained with reference to FIG. 18. However, an explanation about the operation in common with that of the first embodiment has been omitted. Since the processing in steps S501 to S505 is the same as that of the first embodiment, any explanation or illustration in drawings has been omitted.

If it is determined in step S505 that the relevant segment is a three-dimensional object, the processing proceeds to step S521; and if it is determined as the road surface or the sky, the processing proceeds to step 3508. In step S521, the CPU 101 causes the coordinate corresponding point setting unit 118 to set coordinate corresponding points in the vicinity of the outline of the processing target segment and outside and inside that segment.

In the subsequent step S522, the CPU 101 causes the distance modification unit 112 to set the distance information of the coordinate corresponding points which exist outside the segment, from among the coordinate corresponding points set in step S521. This distance of the relevant coordinate corresponding point can be decided based on the distance of a coordinate corresponding point which originally exists outside the outline, or may be decided by assuming that the relevant coordinate corresponding point exists on the road surface. In the subsequent step S506A, the CPU 101 uses the distance modification unit 112 to modify the distance information of all the coordinate corresponding points within the processing target segment, that is, the three-dimensional object distance. However, all the coordinate corresponding points within the processing target segment include the coordinate corresponding point(s) which is/are newly set in step 3521. Since the processing in step S507 and subsequent steps is the same as that of the first embodiment, an explanation about it has been omitted.

The following operational advantage can be obtained according to the above-described second embodiment.

(6) The distance modification unit 112 includes a plurality of combinations between the transformation source coordinates in the captured image and the transformation destination coordinates in the viewpoint transformed image. The table correction unit 113 corrects the transformation source coordinates to be located in the vicinity of the outline of the three-dimensional object area. Therefore, even if the coordinate corresponding points are not set densely by the distance modification unit 112, a three-dimensional shape in the viewpoint transformed image can be reproduced with high precision by correcting the coordinate corresponding points to be located in the vicinity of the outline of the object.

(7) The table correction unit 113 locates the transformation source coordinates in the vicinity of the outline of the three-dimensional object area and outside and inside the three-dimensional object area. Therefore, the three-dimensional shape can be reproduced with further higher precision as indicated in FIG. 15.

Incidentally, the present invention is not limited to the aforementioned embodiments, and includes various variations. For example, the aforementioned embodiments have been described in detail in order to explain the entire system in an easily comprehensible manner and are not necessarily limited to those having all the configurations explained above. Furthermore, part of the configuration of a certain embodiment can be replaced with the configuration of another embodiment and the configuration of another embodiment can be added to the configuration of a certain embodiment. Also, regarding part of the configuration of each embodiment, the configuration of another configuration can be added to, deleted from, or replaced with the above-mentioned part of the configuration. Other embodiments which can be thought of within the scope of the technical idea of the present invention are also included within the scope of the present invention.

Furthermore, part or all of the aforementioned configurations, functions, processing units, processing means, and so on may be realized by hardware by, for example, designing them in integrated circuits. Also, each of the aforementioned configurations, functions, and so on may be realized by software by processors interpreting and executing programs for realizing each of the functions. Information such as programs, tables, and files for realizing each of the functions may be retained in memories, storage devices such as hard disks and SSDs (Solid State Drives), or storage media such as IC cards, SD memory cards, and DVDs.

The disclosure content of the following basic priority application is incorporated here by reference: Japanese Patent Application No. 2017-128280 (filed on Jun. 30, 2017).

REFERENCE SIGNS LIST

10: camera
14: distance detection unit
100: image processing apparatus
101: CPU
104: storage unit
105: interface
111: image recognition unit
112: distance modification unit
113: table correction unit
114: association unit
115: image transformation unit
118: coordinate corresponding point setting unit
121: table data

The invention claimed is:

1. An image processing apparatus comprising:
an image acquisition unit that acquires a captured image with a first spatial resolution;
a distance acquisition unit that acquires a distance image which is depth information with a second spatial resolution that is a resolution lower than the first spatial resolution;

an image recognition unit that extracts an area including a three-dimensional object area corresponding to a three-dimensional object in the captured image;

a distance calculation unit that calculates depth information of the three-dimensional object area on the basis of the distance image;

a correction unit that corrects coordinate transformation information for coordinate transformation of the captured image on the basis of the depth information of the three-dimensional object area calculated by the distance calculation unit; and a viewpoint transformed image generation unit that generates a viewpoint transformed image obtained by the coordinate transformation of the captured image by using the coordinate transformation information corrected by the correction unit.

2. The image processing apparatus according to claim 1, wherein the image recognition unit extracts outlines of a plurality of areas including the three-dimensional object area on the basis of at least one of luminance, hue, color saturation, and brightness of the captured image.

3. The image processing apparatus according to claim 1, wherein the coordinate transformation information includes a plurality of combinations between transformation source coordinates in the captured image and transformation destination coordinates in the viewpoint transformed image; and wherein the correction unit corrects the transformation destination coordinates on the basis of the depth information of the three-dimensional object area.

4. The image processing apparatus according to claim 3, wherein the coordinate transformation information is created in advance on a premise that an object in the captured image is an area on a road surface;

wherein the image recognition unit divides the captured image into a plurality of areas with respect to respective objects included in the captured image; and wherein the correction unit judges whether each of the plurality of areas is the three-dimensional object area or not, based on the distance image and corrects the transformation destination coordinates corresponding to the transformation source coordinates in an area which is judged as the three-dimensional object area.

5. The image processing apparatus according to claim 1, wherein the coordinate transformation information includes a plurality of combinations between transformation source coordinates in the captured image and transformation destination coordinates in the viewpoint transformed image; and wherein the correction unit corrects the transformation source coordinates to be located in the vicinity of an outline of the three-dimensional object area.

6. The image processing apparatus according to claim 5, wherein the correction unit locates the transformation source coordinates in the vicinity of the outline of the three-dimensional object area and outside and inside the three-dimensional object area.

7. The image processing apparatus according to claim 1, wherein the coordinate transformation information is calculated on a premise that an object in the captured image exists within a reference height plane;

wherein the correction unit calculates a height of the object from the reference height plane and a position of the object on the reference height plane by using the depth information of the three-dimensional object area which is calculated by the distance calculation unit; and wherein the correction unit corrects the coordinate transformation information by using a viewpoint transformation reference position, the calculated height of the object from the reference height plane, and the calculated position of the object on the reference height plane.

8. An image transformation method comprising:

acquiring a captured image with a first spatial resolution;

acquiring a distance image which is depth information with a second spatial resolution that is a resolution lower than the first spatial resolution;

extracting an area including a three-dimensional object area corresponding to a three-dimensional object in the captured image;

calculating depth information of the three-dimensional object area on the basis of the distance image;

correcting coordinate transformation information for coordinate transformation of the captured image on the basis of the calculated depth information of the three-dimensional object area; and generating a viewpoint transformed image obtained by the coordinate transformation of the captured image by using the coordinate transformation information corrected by the correction.

9. The image transformation method according to claim 8, wherein the extraction of the area including the three-dimensional object area is executed on the basis of at least one of luminance, hue, color saturation, and brightness of the captured image.

10. The image transformation method according to claim 8, wherein the coordinate transformation information includes a plurality of combinations between transformation source coordinates in the captured image and transformation destination coordinates in the viewpoint transformed image; and wherein the transformation destination coordinates are corrected on the basis of the depth information of the three-dimensional object area.

11. The image transformation method according to claim 10, wherein the coordinate transformation information is created in advance on a premise that an object in the captured image is an area on a road surface;

wherein the captured image is divided into a plurality of areas with respect to respective objects included in the captured image; and wherein whether each of the plurality of areas is the three-dimensional object area or not is judged based on the distance image and the transformation destination coordinates corresponding to the transformation source coordinates in an area which is judged as the three-dimensional object area are corrected.

12. The image transformation method according to claim 8, wherein the coordinate transformation information includes a plurality of combinations between transformation source coordinates in the captured image and transformation destination coordinates in the viewpoint transformed image; and wherein the correction based on the depth information of the three-dimensional object area includes correction of the transformation source coordinates to be located in the vicinity of an outline of the three-dimensional object area.

13. The image transformation method according to claim 12, wherein the correction based on the depth information of the three-dimensional object area includes locating the transformation source coordinates in the vicinity of the outline of the three-dimensional object area and outside and inside the three-dimensional object area.

14. The image transformation method according to claim 8,
wherein the coordinate transformation information is calculated on a premise that an object in the captured image exists within a reference height plane; and
wherein the correction of the coordinate transformation information calculates a height of the object from the reference height plane and a position of the object on the reference height plane by using the calculated depth information of the three-dimensional object area and is performed by using a viewpoint transformation reference position, the calculated height of the object from the reference height plane, and the calculated position of the object on the reference height plane.

* * * * *